United States Patent [19]

Day

[11] 4,245,516
[45] Jan. 20, 1981

[54] CYCLOIDAL DRIVE

[75] Inventor: Harry E. Day, Bloomfield Hills, Mich.

[73] Assignee: Delta Associated Industries Corp., Ferndale, Mich.

[21] Appl. No.: 51,677

[22] Filed: Jun. 25, 1979

[51] Int. Cl.³ .............................................. F16H 37/12
[52] U.S. Cl. .......................................... 74/52; 74/570; 74/602; 100/282
[58] Field of Search ............ 74/52, 570, 571 R, 571 L, 74/571 M, 602; 100/282, 292

[56] References Cited

U.S. PATENT DOCUMENTS

| | | | |
|---|---|---|---|
| 2,199,625 | 5/1940 | Fiala-Fernbrugg | 74/52 |
| 2,515,616 | 7/1950 | Thomas | 74/52 |
| 2,642,937 | 6/1953 | Hallden | 74/571 R |
| 2,822,696 | 2/1958 | Staecker et al. | 74/44 |
| 3,468,173 | 9/1969 | Fracke | 74/52 |
| 3,559,767 | 2/1971 | Gervais | 187/1 |
| 3,886,805 | 6/1975 | Koderman | 74/52 |
| 3,921,465 | 11/1975 | Hosoda et al. | 74/52 |
| 3,956,942 | 5/1976 | Seki et al. | 74/52 |
| 3,960,024 | 6/1976 | Mori et al. | 74/52 |
| 3,971,261 | 7/1976 | Matsushita | 74/52 |
| 4,020,708 | 5/1977 | Obra | 74/52 |
| 4,022,082 | 5/1977 | Uchimoto | 74/570 |
| 4,089,228 | 5/1978 | Obra | 74/52 |
| 4,095,522 | 6/1978 | Drungil | 100/214 |

Primary Examiner—Lawrence J. Staab
Attorney, Agent, or Firm—Harness, Dickey & Pierce

[57] ABSTRACT

A cycloidal type drive for mechanical welding presses, automation systems and similar production type apparatus which requires mid-stroke slow down. The drive comprises an internal sun gear, a concentric bull gear, an idler gear shaft eccentrically supported by the bull gear and carrying idler gears one of which meshes with the sun gear, primary eccentrics secured to the bull gear and rotatably supporting eccentric gears, said idler gears meshing with said eccentric gears, secondary eccentrics secured to the eccentric gears, and means connecting said secondary eccentrics to a driven member. The bull gear shaft may be rotatably supported at both ends and only one primary gear assembly is needed.

7 Claims, 14 Drawing Figures

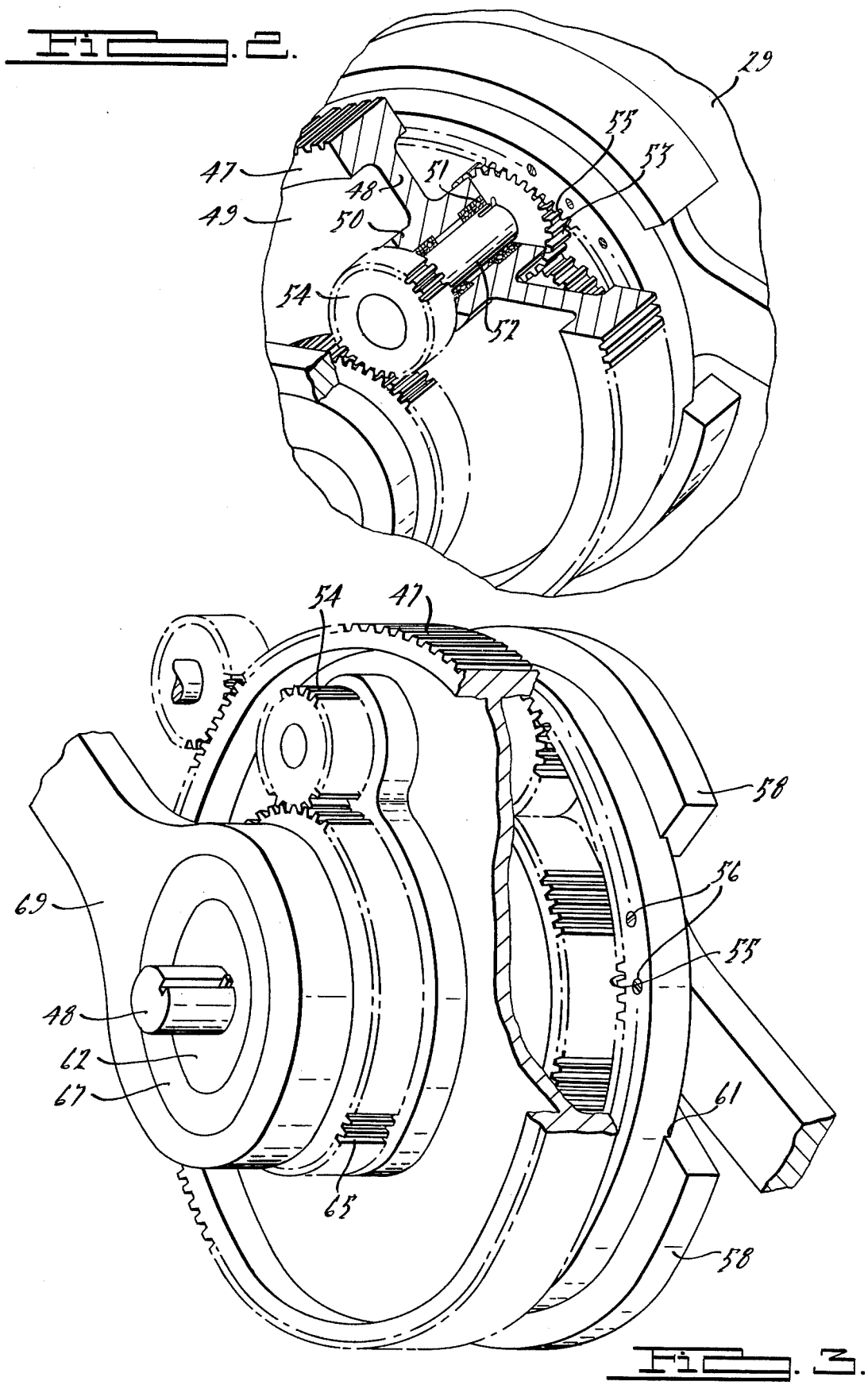

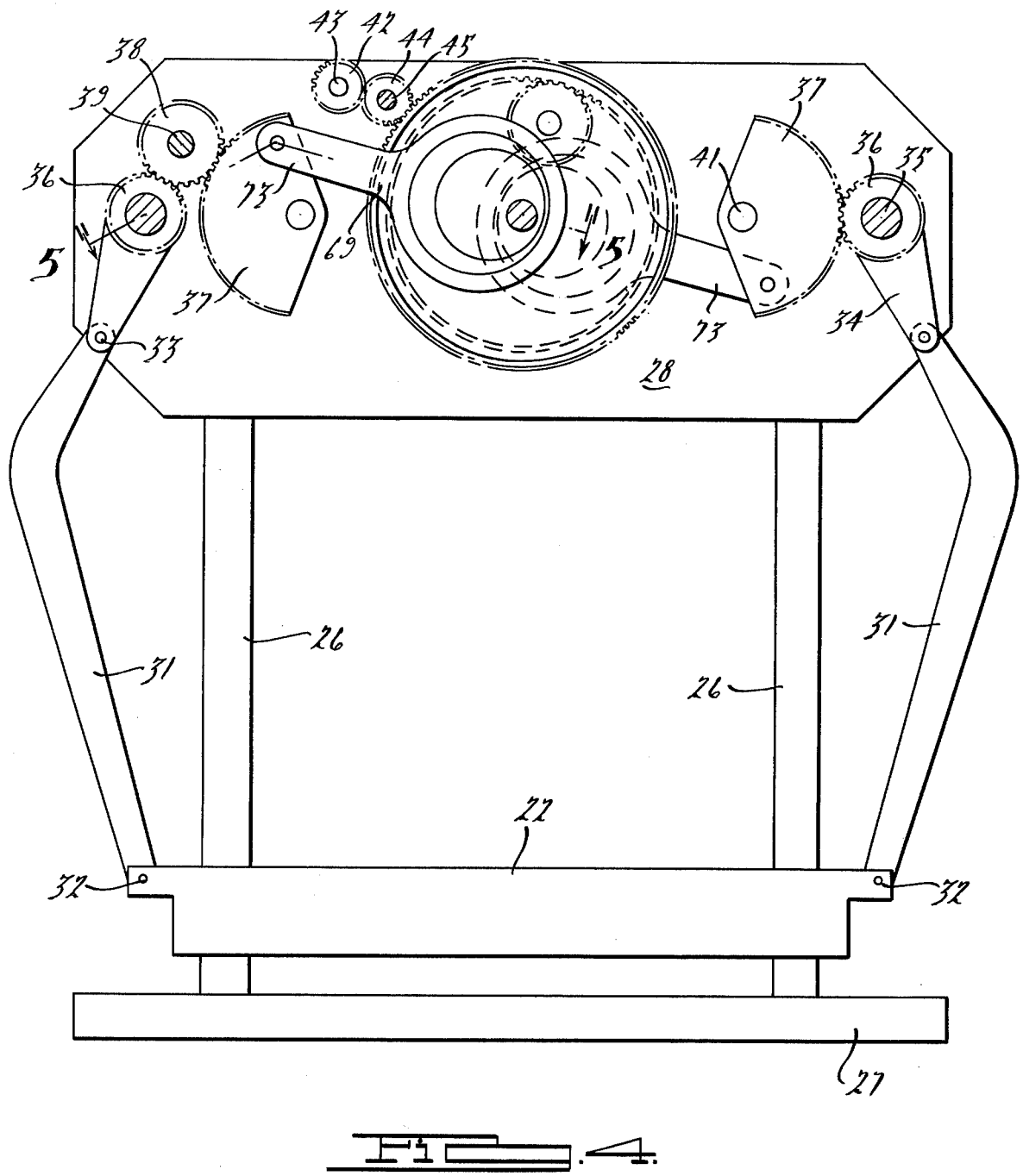

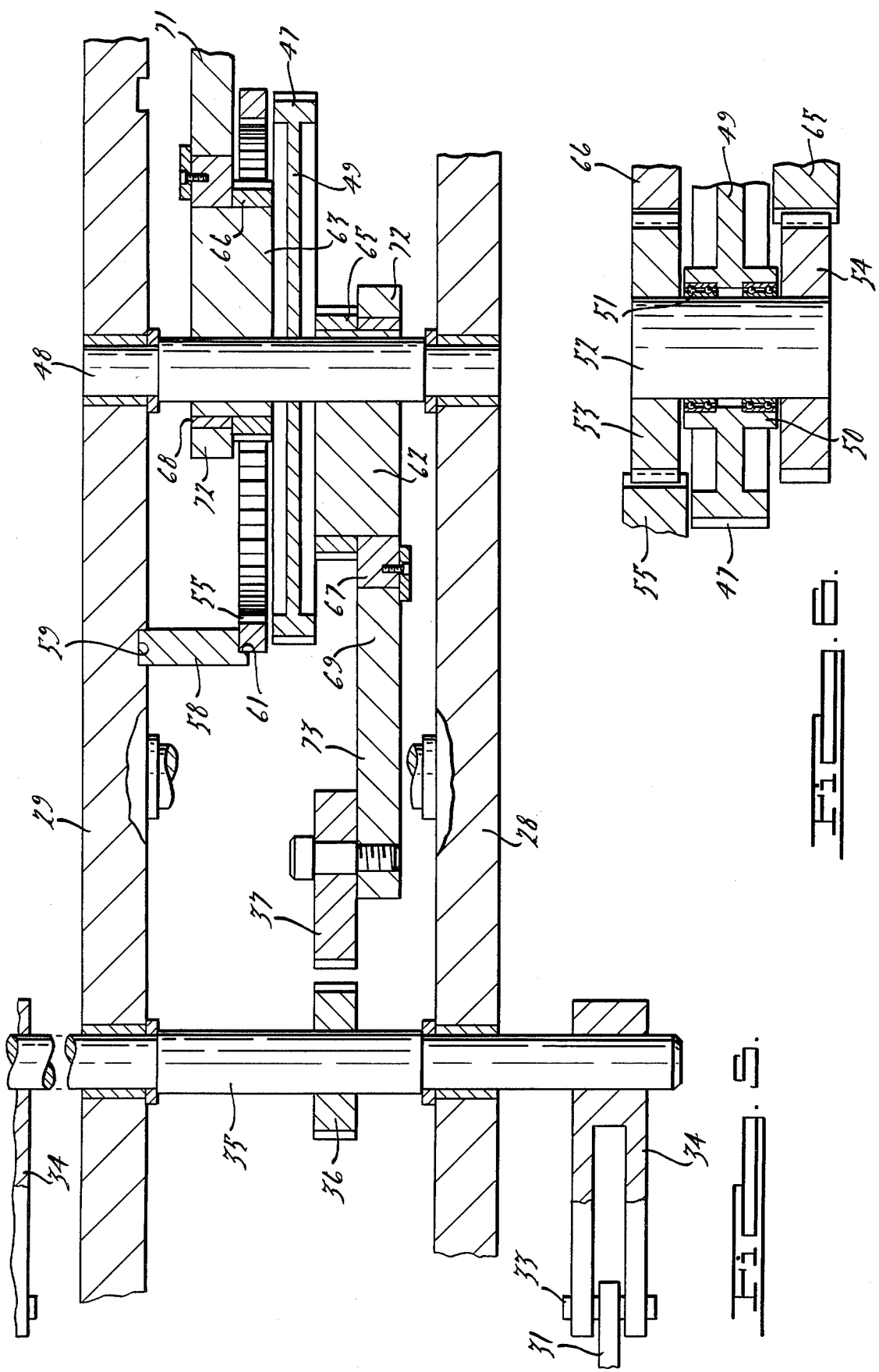

CYCLOIDAL DRIVE

BACKGROUND OF THE INVENTION

1. Field of the Invention

The invention relates to cycloidal drives, and more particularly to drives for reciprocating parts which require speed reduction during intermediate portions of their strokes. An example of such driven parts is a mechanical welding press which requires a mid-stroke slow down so as to minimize shock to parts when they are being lifted from automation rails, and reduce the noise level inherent with this shock condition. Another example is an automation system in which a reciprocating shuttle on a conveyor must be slowed down at mid-stroke for similar purposes.

2. Description of the Prior Art

Gervais U.S. Pat. No. 3,559,767 shows a planetary gear system with a crank arrangement describing an epicycloidal path in order to reduce the platen speed at certain points in the motion. This patented construction has a number of disadvantages as compared with the apparatus of this invention. It utilizes two fixed external sun gears and pin-ended joints, thus requiring two primary gear assemblies and making it impossible, because of the geometry of the construction, to support the bull gear shafts at opposite ends. Instead they must be cantilever mounted. It is further believed that the Gervais construction would not be interchangeable with most present day welding press configurations.

Matsushita U.S. Pat. No. 3,971,261 pertains to a slide driving device for use in metal working presses which is of the cycloidal type. This patent utilizes an external fixed gear and exhibits certain disadvantages as compared with the present invention which will become apparent from the following description.

Seki U.S. Pat. No. 3,956,942 also illustrates a cycloidal arrangement in which there is a reduction of velocity in the center of the stroke. However the mechanism is substantially different than that of the present invention, and advantages of the present invention wll become apparent below.

The following patents are of interest insofar as they pertain to either cycloidal gear trains or to gear train arrangements having some features pertinent to the present invention:

Staecker et al: U.S. Pat. No. 2,822,696
Fracke: U.S. Pat. No. 3,468,173
Koderman: U.S. Pat. No. 3,886,805
Hosoda et al: U.S. Pat. No. 3,921,465
Mori et al: U.S. Pat. No. 3,960,024
Obra: U.S. Pat. No. 4,020,708
Obra: U.S. Pat. No. 4,089,228
Drungil: U.S. Pat. No. 4,095,522

BRIEF SUMMARY OF THE INVENTION

It is an object of the present invention to provide a novel and improved cycloidal type gear drive which overcomes disadvantages of previous drives of this type and provides a mid-stroke slow down while needing only one primary gear assembly.

It is another object to provide an improved cycloidal type drive of this character in which the opposite ends of the bull gear shaft may be rotatably supported, thus contributing to the sturdiness and reliability of the construction.

It is a further object to provide a novel and improved cycloidal drive of this nature which may be designed so as to be interchangeable with present welding press configurations which are of the single bull gear type.

Briefly, the cycloidal drive of this invention comprises a fixed internal sun gear, a bull gear having a shaft concentric with said sun gear, an idler gear eccentrically supported for rotation on said bull gear and meshing with said sun gear, a primary eccentric secured to said bull gear, an eccentric gear rotatably supported by said primary eccentric and driven by said idler gear, a secondary eccentric secured to said eccentric gear, and means connecting said secondary eccentric with a driven member.

In another aspect, the cycloidal type drive of this invention comprises an internal sun gear, a bull gear having a shaft concentric with said sun gear, an idler gear shaft eccentrically supported by said bull gear and having a first idler gear meshing with said sun gear and a second idler gear, a pair of primary eccentrics secured to opposite sides of said bull gear, a pair of eccentric gears rotatably supported by said primary eccentrics and meshing with said first and second idler gears, a pair of secondary eccentrics fixed to said eccentric gears, and means connecting said secondary eccentrics with a driven member.

BRIEF DESCRIPTION OF THE DRAWINGS

FIG. 2 is an enlargement of the central portion of FIG. 1.

FIG. 3 is another perspective view with parts broken away showing the construction.

FIG. 4 is an elevational view of the invention.

FIG. 5 is a sectional view taken along the line 5—5 of FIG. 4.

FIG. 6 is a fragmentary cross-sectional view of the idler gear shaft and its adjacent construction.

DESCRIPTION OF THE PREFERRED EMBODIMENT

Figure 14:
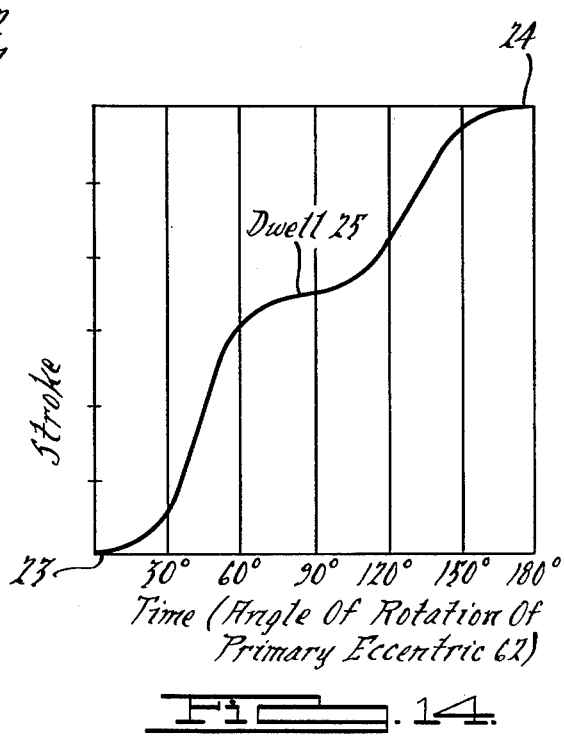
FIG. 14 is a chart showing the variation of stroke with time or angle of rotation of the bull gear.

The cycloidal drive is generally indicated at 21 and is shown as being connected to a platen 22 which may be for a welding press or the like. As shown in FIG. 14, the platen moves between a lower position indicated at 23 and an upper position indicated at 24 during a period of time. The purpose of the invention is to provide a mid-stroke dwell or slow down 25 during both the up stroke and the down stroke of the platen. In the case of a weld press this could be for the purpose of preventing damage to parts as they are lifted or lowered, as well as to reduce noise. The parts in this case could be carried by a conveyor, approached from underneath for lifting, and engaged at the mid portion of the platen stroke. Similarly, the parts would be returned to rest on the conveyor during the mid portion of the lowering stroke of the platen.

Platen 22 is guided on vertical posts 26 resting on a base 27, and a frame having side plates 28, 29 (FIG. 5) is supported at the upper ends of these posts. The platen is supported by two pairs of links 31 which are pivotally connected at 32 to its opposite ends. The upper ends of links 31 are pivotally supported at 33 by arms 34 which are secured to shafts 35. During operation, these two shafts will be rocked in unison by cycloidal drive 21 in opposite directions and at a variable rate to provide the midstroke slow down. Two arms 34 are secured to each shaft 35 so that the platen is supported at its four corners by four links 31. An output gear 36 is secured to shaft 35 between its two arms 34. Each output gear 36 is driven by a sector gear 37, and one is driven through an idler gear 38 supported on a shaft 39, this shaft being supported between frame members 28 and 29. The two sector gears 37 are likewise supported between the frame members by shafts 41.

The cycloidal gear drive comprises an input gear 42 supported on a shaft 43 extending between frame members 28 and 29. This input gear drives an intermediate gear 44 which is likewise supported on a shaft 45 extending between the two frame members. A gear 46 is secured to shaft 45 and meshes with a bull gear 47 secured to a shaft 48 extending between frame members 28 and 29.

The construction of bull gear 47 and its associated parts is perhaps best seen in FIGS. 2 and 3. The bull gear is an external gear having a web 49, and a shaft supporting sleeve 50 is formed at an intermediate portion of this web and extends to opposite sides thereof. Bearings 51 are supported within this sleeve and in turn support an idler shaft 52. A first idler gear 53 and a second idler gear 54 are secured to the ends of this shaft and are disposed on opposite sides of the bull gear.

A stationary internal sun gear 55 is secured by fasteners 56 to the inside surface 57 of frame member 29 by means of arcuate supporting means 58. More particularly, a recess 59 is formed on surface 57 and supporting means 58 is mounted in this recess and extends into the space between frame members 28 and 29. Fasteners 56 secure internal sun gear to supporting means 58, which is notched at 61 for this purpose. Idler gear 53 meshes with internal sun gear 55.

A pair of primary eccentrics 62 and 63 are disposed on opposite sides of bull gear 47 and keyed, along with the bull gear, to bull gear shaft 48, as seen in FIG. 5. These eccentrics extend in opposite directions, and the center of one eccentric 62 is indicated at 64 in FIGS. 7 through 13. An eccentric gear 65 is rotatably mounted on eccentric 62 and an eccentric gear 66 is rotatably mounted on eccentric 63. The rotational axis of these two eccentric gears coincide with the axes of the respective eccentrics on which they are supported. First idler gear 53 meshes with eccentric gear 66 and second idler gear 54 meshes with eccentric gear 65. A secondary eccentric 67 is secured to eccentric gear 65, and a secondary eccentric 68 is secured to eccentric gear 66. These two secondary eccentrics are on the outsides of their respective eccentric gears as seen in FIG. 5 and will rotate therewith. They, like the eccentric gears to which they are secured, are rotatably supported by primary eccentrics 62 and 63 respectively. However their central axes are displaced from those of the eccentrics on which they are supported. For example, the central axis of secondary eccentric 67 is indicated at 69 in FIGS. 7 through 13. It will be observed that the supporting means 58 permits rotaton of parts 63, 66 and 68 in the space between bull gear 47 and frame side plate 29.

A pair of banjos 69 and 71 are provided for connecting secondary eccentrics 67 and 68 respectively with sector gears 37. Each banjo comprises a circular portion 72 surrounding its respective secondary eccentric gear and an arm 73 pivotaly connected at 74 at one end of the sector gear 37.

The operaton of the cycloidal gear drive may perhaps best be described with respect to sequential diagrams 7 through 13, which show the action of one side of the drive, as well as FIG. 14 which is a typical time-strke diagram. Starting with the position shown in FIG. 7, platen 22 will be in its lowermost position which corresponds to the position marked 23 in FIG. 14. At this point the primary eccentric 62 which rotates with bull gear 47 will be extended the maximum distance toward the pivotal connection 74 between banjo 69 and sector gear 37. Likewise, the secondary eccentric 67 will be extended the maximum distance toward pivot 74.

Figure 1:
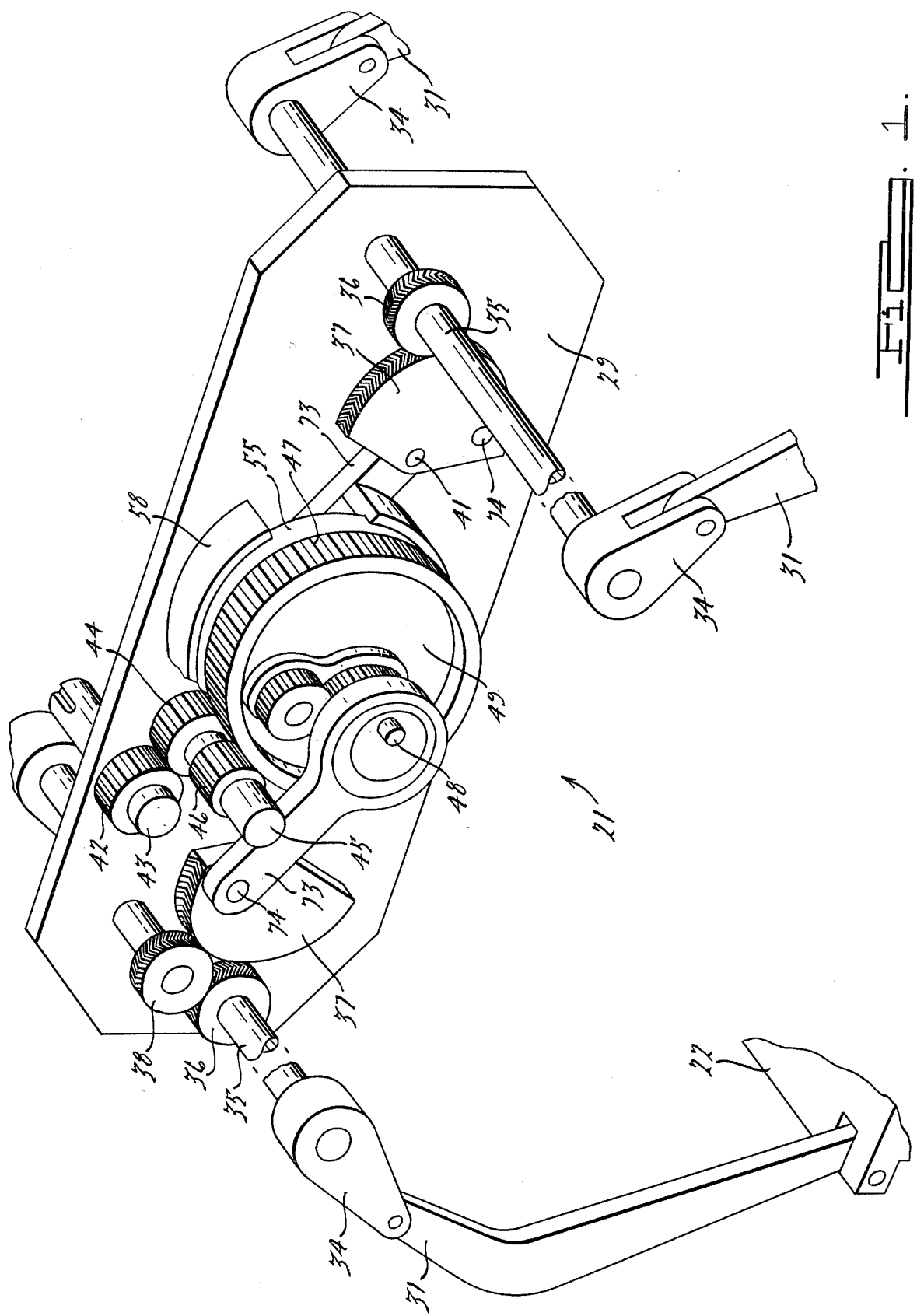
FIG. 1 is a perspective view, with parts broken away, showing the construction of the present invention.
Figure 7:
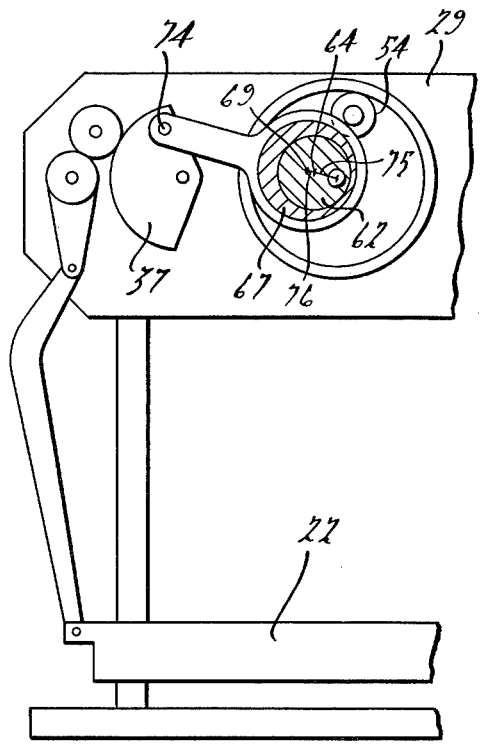
FIGS. 7 through 13 are diagrammatic views showing how the invention operates.
Figure 8:
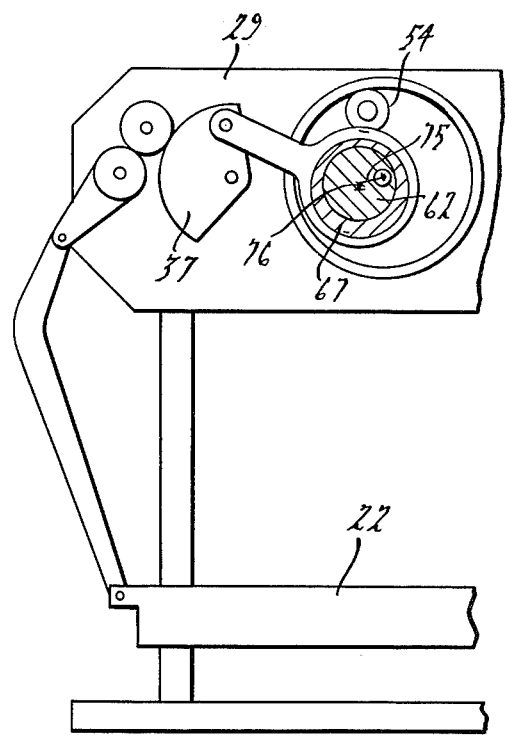

FIG. 8 illustrates the positions of the parts when primary eccentric 62 has rotated 30°. For this purpose the throw of the primary eccentric is indicated at 75 in FIG. 8. Because of the meshing of first idler gear 53 with internal sun gear 55, and the meshing of second idler gear 54 with eccentric gear 65, the eccentric gear, and its attached secondary eccentric 67, will have rotated 60° on its own axis when the primary eccentric 62 will have rotated 30°, and will have also rotated an additional 30° about the axis of the primary eccentric on which it is supported. The throw of secondary eccentric 67 is indicated at 76 in FIG. 8. This combined action will cause banjo 69 to move sector gear 37 clockwise, thus lifting platen 22. The rate of lifting between the positions of FIGS. 7 and 8 could be characterized as medium speed. This speed is indicated by the inclination of the stroke path between 0° and 30° in FIG. 14.

Figure 9:
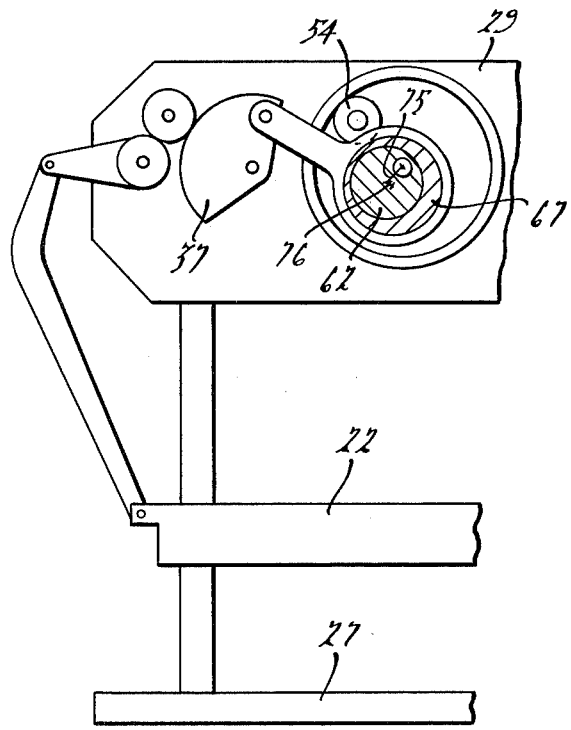

FIG. 9 illustrates the positions of the parts when primary eccentric 62 is rotated 60°. At this point throw 75 of the primary eccentric has also rotated 60° but throw 76 of the secondary eccentric has rotated an additional 120° on its own axis. It will be noted that banjo 69 has been retracted to the right at a faster rate than the rate between 0° and 30°. This is reflected in the slope shown in FIG. 14 between 30° and 60°.

Figure 10:
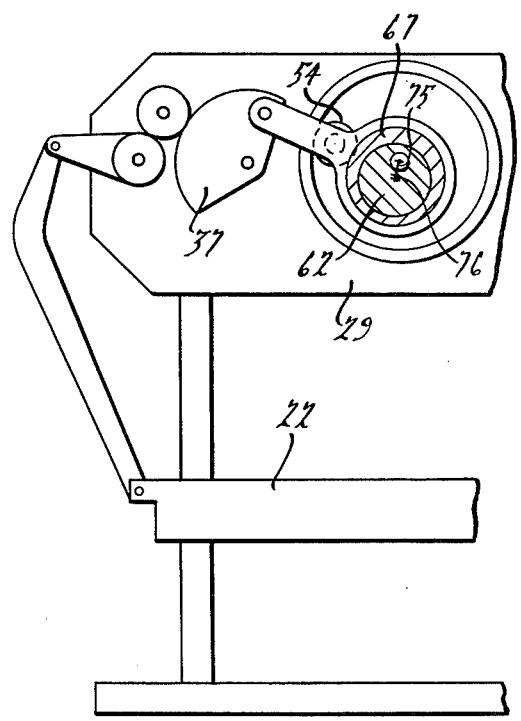

FIG. 10 shows the positions of the parts when the primary eccentric 62 has rotated 90°. It will be seen that the secondary eccentric 67 has rotated an additional 180° on its own axis and that its throw 76 is doubled back on the throw 75 of primary eccentric 62. Between the 60° and 90° position the upward speed of the platen 22 has slowed almost to a complete dwell because of the shortening of the effective throw and the fact that throw 76 is advancing to the left in FIG. 10, partially counteracting the movement of throw 75 to the right. This particular diagram illustrates well the difference between the operation of the present invention and that of a conventional single eccentric in which, at this point, the throw would be at a maximum distance and in a direction to create the greatest speed of movement.

Figure 11:
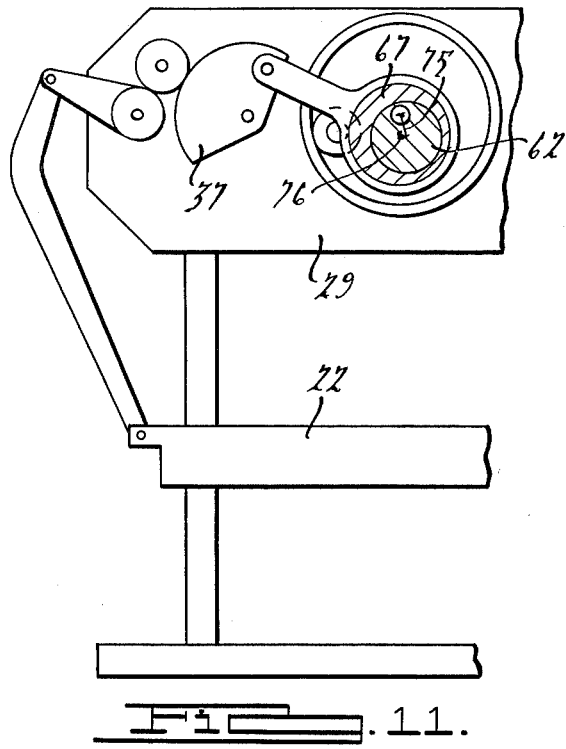

FIG. 11 illustrates the 120° position of primary eccentric 62 and the additional 240° position of secondary eccentric 67. As seen in FIG. 14, the platen movement is accelerating from the dwell condition of FIG. 10. This is because the movement of the secondary eccentric is no longer directly counteracting that of the primary eccentric, and the throw of the latter is still effective.

Figure 12:
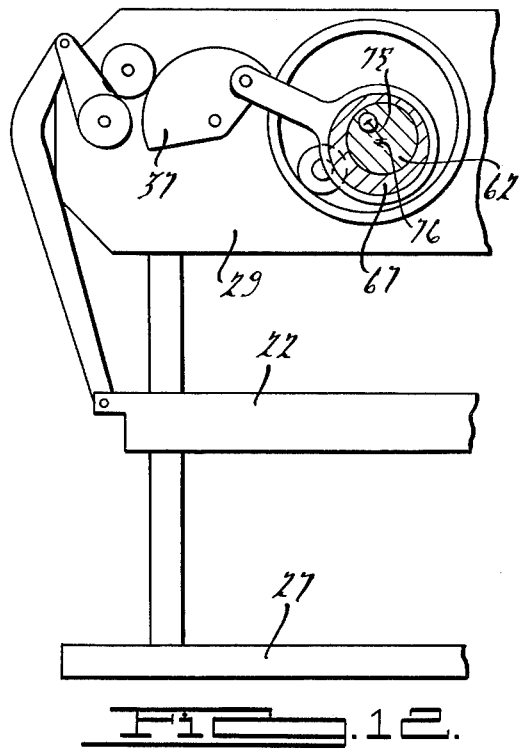

FIG. 12 illustrates the condition of the parts when the primary eccentric has rotated 150° and the secondary eccentric an additional 300° on its own axis. The maximum velocity of platen 22 will occur between the positions of FIGS. 11 and 12, and deceleration will then be taking place on shown in FIG. 14. Primary throw 75 is losing effectiveness and while secondary throw 76 is effective, it is considerably shorter.

Figure 13:
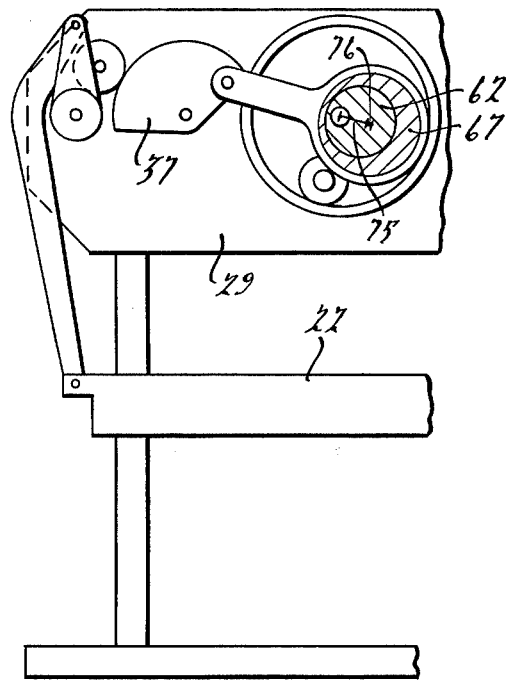

FIG. 13 shows the position of the parts when the platen 22 has reached the top of its stroke. Both primary throw 75 and secondary throw 76 are extended fully away from pivotal connection 74, causing sector 37 to have reached its fully clockwise position. Deceleration will have continued between the positions of FIGS. 12 and 13.

The movement of the parts between the 180° position of primary eccentric 62 and its zero position as shown in FIG. 7 will essentially be the reverse of those described above, and the curve of acceleration and deceleration of the descending platen will substantially be the mirror image of the curve shown in FIG. 14. That is, as in the upstroke, there will be a dwell or slow down at an intermediate portion of the stroke. The movement of primary eccentric 66 and secondary eccentric 68 will of course be the same as that for eccentrics 65 and 67 but will operate on the other sector gear 37. The actual shape of the time-stroke arm could of course be varied to suit requirements, depending upon gear ratios and sizes.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. A cycloidal drive comprising a fixed internal sun gear, a bull gear having a shaft concentric with said sun gear, an idler gear eccentrically supported for rotation on said bull gear and meshing with said sun gear, a primary eccentric secured to said bull gear, an eccentric gear rotatably supported by said primary eccentric and driven by said idler gear, a secondary eccentric secured to said eccentric gear, and means connecting said secondary eccentric with a driven member.

2. The combination according to claim 1, said connecting means comprising a banjo having a sleeve surrounding said secondary eccentric and an arm connected to said driven member.

3. A cycloidal drive comprising an internal sun gear, a bull gear having a shaft concentric with said sun gear, an idler gear shaft eccentrically supported by said bull gear and having a first idler gear meshing with said sun gear and a second idler gear, a pair of primary eccentrics secured to opposite sides of said bull gear, a pair of eccentric gears rotatably supported by said primary eccentrics and meshing with said first and second idler gears, a pair of secondary eccentrics fixed to said eccentric gears, and means connecting said secondary eccentrics with a driven member.

4. The combination according to claim 3, said connecting means comprising a pair of banjos having sleeve portions surrounding said secondary eccentrics and arms connected to said driven member.

5. The combination according to claims 3 or 4, further provided with bearing means for said bull gear shaft at opposite ends thereof.

6. The combination according to claims 1 or 3 in which said driven member comprises a platen mounted for reciprocating movement on a frame to and from a first position and a second position.

7. The combination according to claim 3 in which said primary eccentrics extend in opposite directions.

* * * * *